United States Patent
Yonenaga et al.

(10) Patent No.: US 6,934,308 B1
(45) Date of Patent: Aug. 23, 2005

(54) PRECODING CIRCUIT AND PRECODING-MULITPLEXING CIRCUIT FOR REALIZING VERY HIGH TRANSMISSION RATE IN OPTICAL FIBER COMMUNICATION

(75) Inventors: Kazushige Yonenaga, Yokosuka (JP); Mikio Yoneyama, Isehara (JP); Koichi Murata, Yokosuka (JP); Yutaka Miyamoto, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/496,974

(22) Filed: Feb. 2, 2000

(30) Foreign Application Priority Data

Feb. 3, 1999 (JP) .................................. 11-026408

(51) Int. Cl.[7] .............................. H04J 3/00; G06F 11/10
(52) U.S. Cl. ........................ 370/535; 370/540; 326/52; 327/407
(58) Field of Search ................................ 370/532, 535, 370/537, 540, 542, 544; 326/52, 39, 40, 41, 326/46, 47; 327/107, 176, 276, 407, 141, 327/155, 161, 261, 392; 375/354, 355, 358

(56) References Cited

U.S. PATENT DOCUMENTS

| | | | | |
|---|---|---|---|---|
| 3,760,109 A | * | 9/1973 | Kogo et al. ............. | 179/15 BA |
| 3,846,787 A | * | 11/1974 | Myers et al. ......... | 340/347 AD |
| 3,851,099 A | * | 11/1974 | Reisinger ..................... | 178/50 |
| 3,995,119 A | * | 11/1976 | Pachynski, Jr. ......... | 179/15 AF |
| 4,114,710 A | * | 9/1978 | Katoh et al. ................. | 375/290 |
| 4,630,263 A | * | 12/1986 | Townsend et al. ............. | 370/85 |
| 4,887,269 A | * | 12/1989 | Cominetti et al. ............. | 371/47 |
| 4,926,423 A | * | 5/1990 | Zukowski .................... | 370/112 |
| 5,111,455 A | * | 5/1992 | Negus ......................... | 370/518 |
| 5,148,383 A | * | 9/1992 | Jaeger ......................... | 708/319 |

(Continued)

FOREIGN PATENT DOCUMENTS

JP           08-139681           5/1996

(Continued)

OTHER PUBLICATIONS

"Dispersion-Tolerant Optical Transmission System Using Duobinary Transmitter and Binary Receiver,"*Journal of Lightwave Technology*, vol. 15, No. 8, pp. 1530-1537, Aug. 1997.

*Primary Examiner*—Alpus H. Hsu
(74) *Attorney, Agent, or Firm*—Brenda O. Holmes; Kilpatrick Stockton LLP

(57) ABSTRACT

A precoding-multiplexing circuit is formed by a precoding circuit for carrying out a precoding with respect to n sets of parallel input binary data signals having a bit rate equal to R/n, to obtain n sets of parallel precoded signals, and a time division multiplexer for time division multiplexing the parallel precoded signals obtained by the precoding circuit, in units of one bit, and outputting time division multiplexed output signal having a bit rate equal to R. In this configuration, the encoding is realized by processing electric signals before the time division multiplexing, so that it becomes possible for the preceding circuit to handle signals which are slower than the transmission rate, and therefore it becomes easier to realize the higher transmission rate.

22 Claims, 13 Drawing Sheets

U.S. PATENT DOCUMENTS

| | | | | |
|---|---|---|---|---|
| 5,200,647 A | * | 4/1993 | Motoike | 327/403 |
| 5,282,210 A | * | 1/1994 | Slegel et al. | 370/537 |
| 5,543,952 A | | 8/1996 | Yonenaga et al. | 359/181 |
| 5,809,039 A | * | 9/1998 | Takahashi et al. | 714/726 |
| 6,243,847 B1 | * | 6/2001 | McClellan et al. | 714/800 |

FOREIGN PATENT DOCUMENTS

| | | |
|---|---|---|
| JP | 09-236781 | 9/1997 |
| JP | 10-164010 | 6/1998 |
| JP | 11-122205 | 4/1999 |

\* cited by examiner

US 6,934,308 B1

PRECODING CIRCUIT AND PRECODING-MULITPLEXING CIRCUIT FOR REALIZING VERY HIGH TRANSMISSION RATE IN OPTICAL FIBER COMMUNICATION

BACKGROUND OF THE INVENTION

1. Field of the Invention

The present invention relates to a preceding circuit and a precoding-multiplexing circuit for use in generation of very high speed signals to be utilizing in an optical fiber communication system.

2. Description of the Background Art

In the very high speed optical fiber communication system, the influence of the chromatic dispersion of an optical fiber transmission line becomes noticeable.

As a transmission scheme with a high dispersion tolerance, the optical duobinary transmission scheme is known. The optical duobinary transmission scheme can realize the dispersion tolerance approximately twice higher than that of the Non-Return-to-Zero (abbreviated hereafter as NRZ) transmission scheme, so that it is expected to be applicable to the very high speed optical transmission system (see K. Yonenaga and S. Kuwano, "Dispersion-Tolerant Optical Transmission System Using Duobinary Transmitter and Binary Receiver", Journal of Lightwave Technology, Vol. 15, No. 8, pp. 1530–1537, August 1997).

A conventional transmitter of the optical duobinary transmission system has a configuration shown in FIG. 1, which shows an exemplary case of transmitting two input signals X1 and X2 by time division multiplexing. A multiplexer 1 is formed by a circuit such as a signal selector for alternately selecting two input signals X1 and X2 periodically.

As shown in FIG. 2, in a signal X3 outputted by the multiplexer 1, components of the two input signals X1 and X2 appear alternately in time division. In this example, the number of multiplexing is two, so that the bit rate of the signal X3 is twice higher than that of the input signals X1 and X2.

The signal X3 outputted by the multiplexer 1 is entered into a precoding circuit called precoder. In general, as shown in FIG. 1, a precoder 2 is formed by an exclusive OR (EXOR) circuit 21 and a one-bit delay 22. A signal X5 delayed by the one-bit delay 22 is fed back to an input of the EXOR circuit 21.

As shown in FIG. 2, the precoder 2 inverts the logical value of the output only when the logical value of its input signal X3 is "1", and maintains the logical value of the output when the logical value of its input signal X3 is "0".

The EXOR circuit 21 of the precoder 2 calculates the exclusive OR of the input signal X3 and a signal X5 obtained by delaying its output signal X4 for one bit time. The state of the signal X5 outputted by the precoder 2 changes according to the initial value of the signal X4 outputted by the EXOR circuit 21. In the example shown in FIG. 2, it is assumed that the initial value of the signal X4 is the logical value "0", but the case where the initial value of the signal X4 is the logical value "1" is similar except that the logical value of the signal is inverted. Note that a delay time due to the EXOR circuit 21 and the like is not taken into consideration in the example of FIG. 2.

In the example of FIG. 1, the output signal X5 of the precoder 2 is taken from the output of the one-bit delay 22, but there is also a case where the output signal X4 of the EXOR circuit 21 is taken as the output signal of the precoder 2. In such a case, the signal timing will be shifted by one bit but there is no essential difference.

The binary signal outputted by the precoder 2 is entered into a logical inverter 3. This logical inverter 3 outputs a non-inverted signal and an inverted signal which have phases differing by 180° each other. These non-inverted signal and inverted signal are converted into a non-inverted duobinary signal and an inverted duobinary signal through separately provided low pass filters (LPF) 4 and 5 respectively, and applied as modulating electric signals to a push-pull type MZ (Mach-Zehnder) modulator 7.

For the low pass filters 4 and 5, filters having a blocking frequency that is approximately ¼ of the transmission rate are used, for example. Through the low pass filters 4 and 5, the non-inverted signal and the inverted signal are converted from binary values of "0" and "1" into signal sequence voltages in ternary values of "−1", "0" and "1".

The MZ modulator 7 modulates the transmission of lights entered from a light source 6 formed by a laser diode or the like according to the non-inverted duobinary signal and the inverted duobinary signal. Namely, when the signals in ternary values of "−1", "0" and "1" are applied as the non-inverted duobinary signal and the inverted duobinary signal, the transmission becomes maximum when the signal has a value "−1" or "1" and minimum when the signal has a value "0".

Note however that the case where the ternary non-inverted duobinary signal has a value "1" and the ternary inverted duobinary signal has a value "−1" and the case where the ternary non-inverted duobinary signal has a value "−1" and the ternary inverted duobinary signal has a value "1" are different in that the phase of the light outputted from the MZ modulator is reversed due to the inversion of the polarity of the applied voltage. In other words, the MZ modulator 7 outputs optical pulses in which the intensity and the phase of the light are modulated according to the ternary duobinary signals.

The optical pulses outputted from the MZ modulator 7 are amplified by the erbium-doped fiber amplifier (EDFA) 8, and then outputted to an optical transmission line (not shown).

In the transmitter of this type of optical duobinary transmission system, conventionally the precoding circuit has been made faster by using the high speed IC process.

However, in the case where the conventional precoding circuit is used in processing multiplexed signals which have the same rate as the transmission rate as a result of the time division multiplexing of electric signals by the multiplexer as shown in FIG. 1, the following problems occur if an attempt to make the transmission rate even higher.

First, there is a problem in that the multiplexed signals cannot be processed because of the limitation on the bit rate of the EXOR circuit. The bit rate of the signals processed by a selector circuit that constitutes the multiplexer is only up to ½ of the transmission rate, but the EXOR circuit is required to process high speed signals as fast as the transmission rate which is the maximum bit rate.

For this reason, if the EXOR circuit and the selector circuit are formed using the same transistor process, the EXOR circuit generally cannot process the signals in the maximum operation bit rate of the selector circuit.

Second, there is a problem in that the realization of one-bit delay is difficult. As a way of realizing one-bit delay, a method utilizing the propagation delay time of the feedback transmission line, a method utilizing the propagation delay of buffer amplifiers connected in series, and a method using a D type flip-flop (abbreviated hereafter as "D-F/F")

are known. In particular, the method using D-F/F is very effective because it is possible to set the delay time to the optimal value by adjusting the phase of clock signals externally using a configuration shown in FIG. 3.

However, if the propagation delay of the circuit becomes unignorable compared with a time-slot of one bit duo to the increase of the transmission rate, the delay time required for the feedback to the EXOR circuit would become longer than one time-slot time.

This point will now be described by referring to an exemplary case shown in FIG. 3 and FIG. 4. In this example, it is assumed that the input signal data is in a form of "1100 . . . " and that the initial state of the output signal of the EXOR circuit of FIG. 3 is "0".

As shown in FIG. 4, in response to the first "1" bit of the input signal, the EXOR circuit 12 inverts the logical value of the output signal from "0" to "1" after an internal delay time d1. Also, a delay time d2 is required at the D-F/F 13 since reading the signal outputted by the EXOR circuit 12 until outputting it.

The D-F/F 13 is generally called master-slave type, which has a two-stage internal configuration formed by a master latch and a slave latch. When the clock signal is "0", the master latch reads the input, and at an instance of the transition of the clock signal from "0" to "1", the logical level determined inside the master latch is read into the slave latch while the output of the D-F/F 13 is rewritten and the rewritten information is maintained until the clock signal becomes "1" state next. Consequently, the delay time d2 inevitably includes a delay of a half period of the clock required for the D-F/F 13 since reading the input until rewriting, in addition to the propagation delay of the circuit itself.

In order for the preceding circuit to realize the one-bit delay, it is necessary for a sum of the above described delay times d1 and d2 to coincide with the one-bit delay time. However, when the total delay time exceeds the one-bit delay due to the increase of the transmission rate, the phase shift of signals at the input terminal of the EXOR circuit 12 occurs and this in turn causes an operation error due to the occurrence of a notch in the output signal of the EXOR circuit 12 as shown in FIG. 4.

As described, in the conventional encoder circuit such as the precoder, the propagation delay of the circuit itself becomes unignorable in addition to the limitation on the bit rate of the circuit itself, so that it has been quite difficult to make the circuit faster.

SUMMARY OF THE INVENTION

It is therefore an object of the present invention to provide a precoding circuit and a precoding-multiplexing circuit capable of handling very high transmission rate by a simple configuration.

According to one aspect of the present invention there is provided a precoding-multiplexing circuit, comprising: a precoding circuit for carrying out a precoding with respect to n sets of parallel input binary data signals having a bit rate equal to R/n, to obtain n sets of parallel precoded signals; and a time division multiplexer for time division multiplexing the parallel precoded signals obtained by the precoding circuit, in units of one bit, and outputting a time division multiplexed output signal having a bit rate equal to R.

According to another aspect of the present invention there is provided a precoding circuit, comprising: an input receiving n sets of paralle input binary data signals having a bit rate equal to R/n; a precoder for carrying out a precoding with respect to the parallel input binary data signals, to obtain n sets of parallel precoded signals, such that time division multiplexed signals having a bit rate equal to R that can be obtained by time division multiplexing the parallel precoded signals will be equivalent to signals that can be obtained by preceding n sets of binary data signals that are time division multiplexed in units of one bit in advance; and an output outputting the parallel precoded signals obtained by the precoder.

According to another aspect of the present invention there is provided a differential encoder for carrying out a precoding with respect to input binary data signals, to obtain encoded signals in which an output logical value is maintained for a first input logical value while an output logical value is inverted for a second input logical value, comprising: an EXOR circuit having one input to which the input binary data signals are entered; and a D-type flip-flop connected to an output of the EXOR circuit and formed by a master latch and a slave latch, an output of the master latch being fed back to another input of the EXOR circuit while also entered into the slave latch, and an output of the slave latch being outputted as an output of the differential encoder.

According to another aspect of the present invention there is provided a differential encoder for carrying out a precoding with respect to input binary data signals, to obtain encoded signals in which an output logical value is maintained for a first input logical value while an output logical value is inverted for a second input logical value, comprising: (n−1) sets of first delay units connected in series, for sequentially delaying an input of the differential encoder, for one time-slot time at each first delay unit; a first EXOR circuit for calculating an exclusive OR value of all of the input of the differential encoder and (n−1) sets of outputs of the first delay units; a second EXOR circuit having one input connected to an output of the first EXOR circuit, an output of the second EXOR circuit being outputted as an output of the differential encoder; and a second delay unit for delaying an output of the second EXOR circuit for n time-slot time, an output of the second delay unit being fed back to another input of the second EXOR circuit.

Other features and advantages of the present invention will become apparent from the following description taken in conjunction with the accompanying drawings.

DETAILED DESCRIPTION OF THE PREFERRED EMBODIMENTS

Referring now to FIG. 5 to FIG. 12, the first embodiment of a precoding circuit and a precoding-multiplexing circuit according to the present invention will be described in detail.

Figure 5:
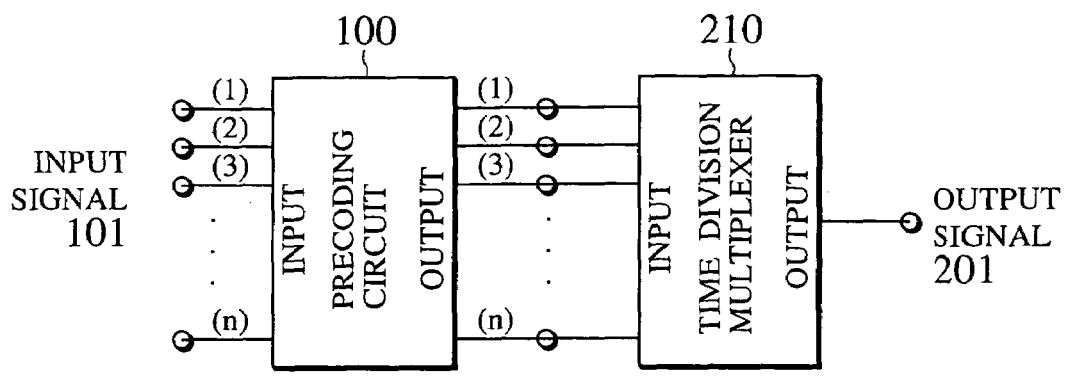
FIG. 5 is a block diagram showing a schematic configuration of a precoding-multiplexing circuit according to the first embodiment of the present invention.
Figure 6:
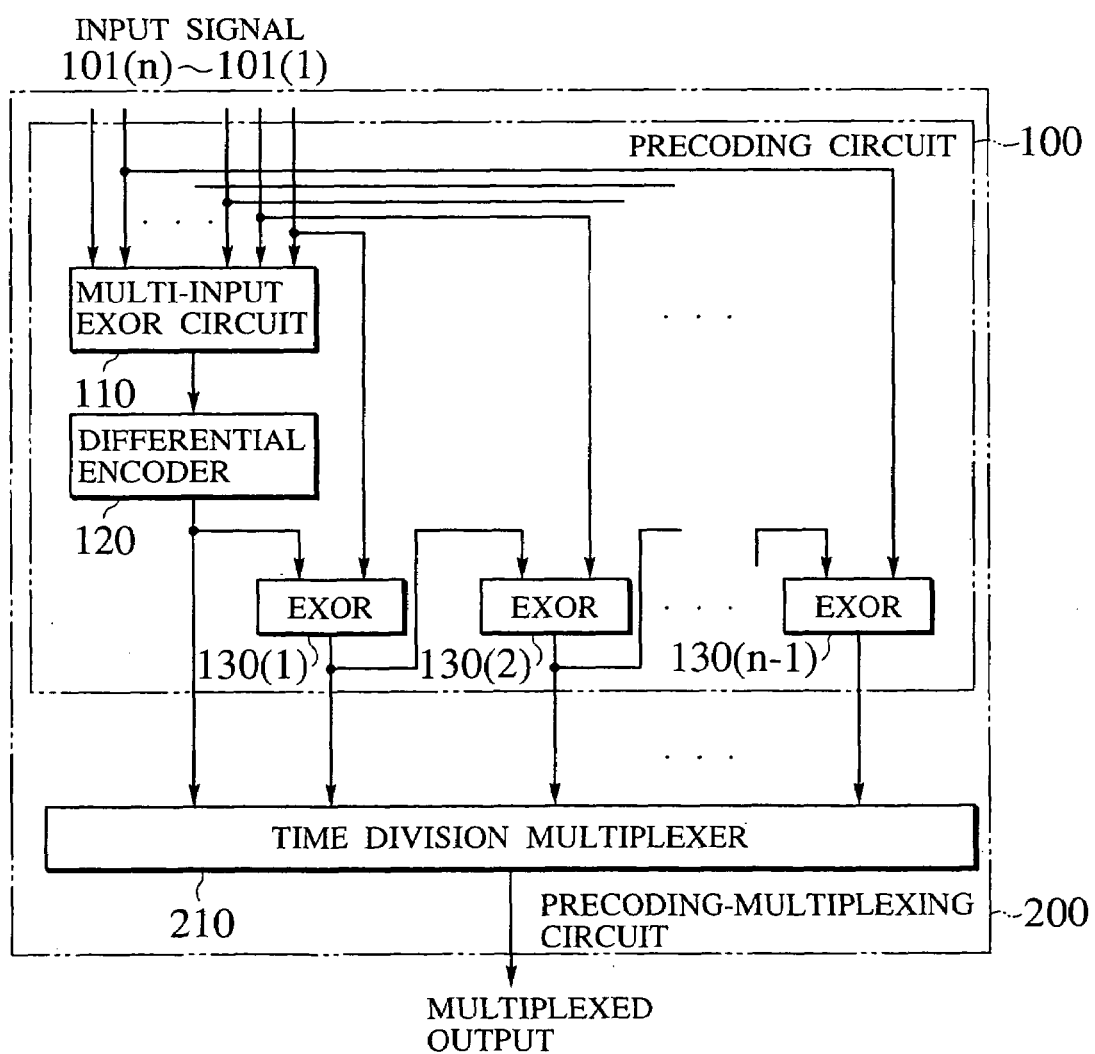
FIG. 6 is a block diagram showing a detailed configuration of a precoding circuit in the precoding-multiplexing circuit of FIG. 5.
Figure 7:
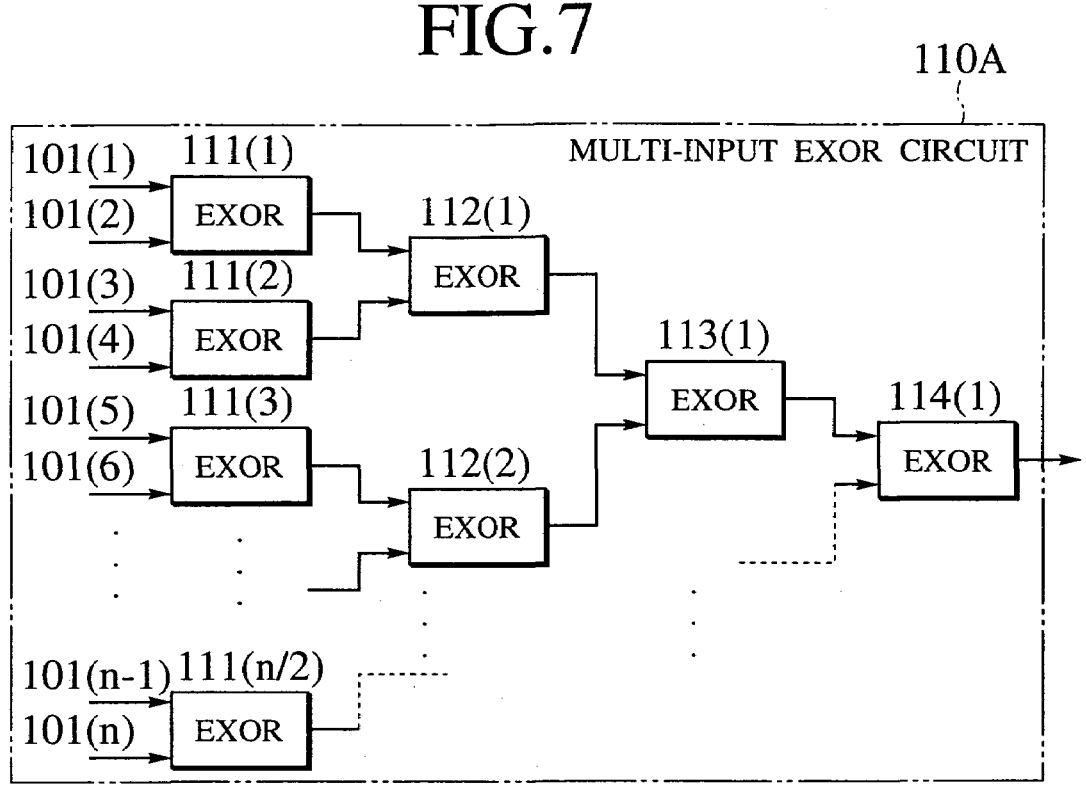
FIG. 7 is a block diagram showing one exemplary configuration of a multi-input EXOR circuit that can be used in the precoding circuit of FIG. 6.
Figure 8:
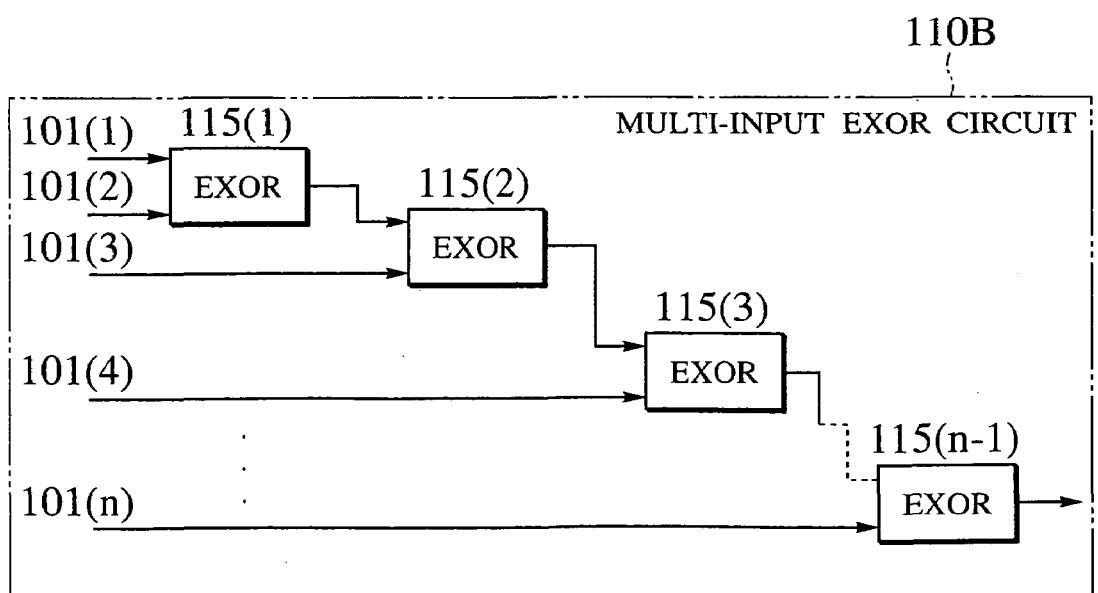
FIG. 8 is a block diagram showing another exemplary configuration of a multi-input EXOR circuit that can be used in the precoding circuit of FIG. 6.

FIG. 5 shows a schematic configuration of a precoding-multiplexing circuit in this first embodiment, and FIG. 6 shows a detailed configuration of the precoding-multiplexing circuit of FIG. 5. FIG. 7 shows one exemplary configuration of a multi-input EXOR circuit used in the configuration of FIG. 6, and FIG. 8 shows another exemplary configuration of a multi-input EXOR circuit used in the configuration of FIG. 6.

Figure 9:
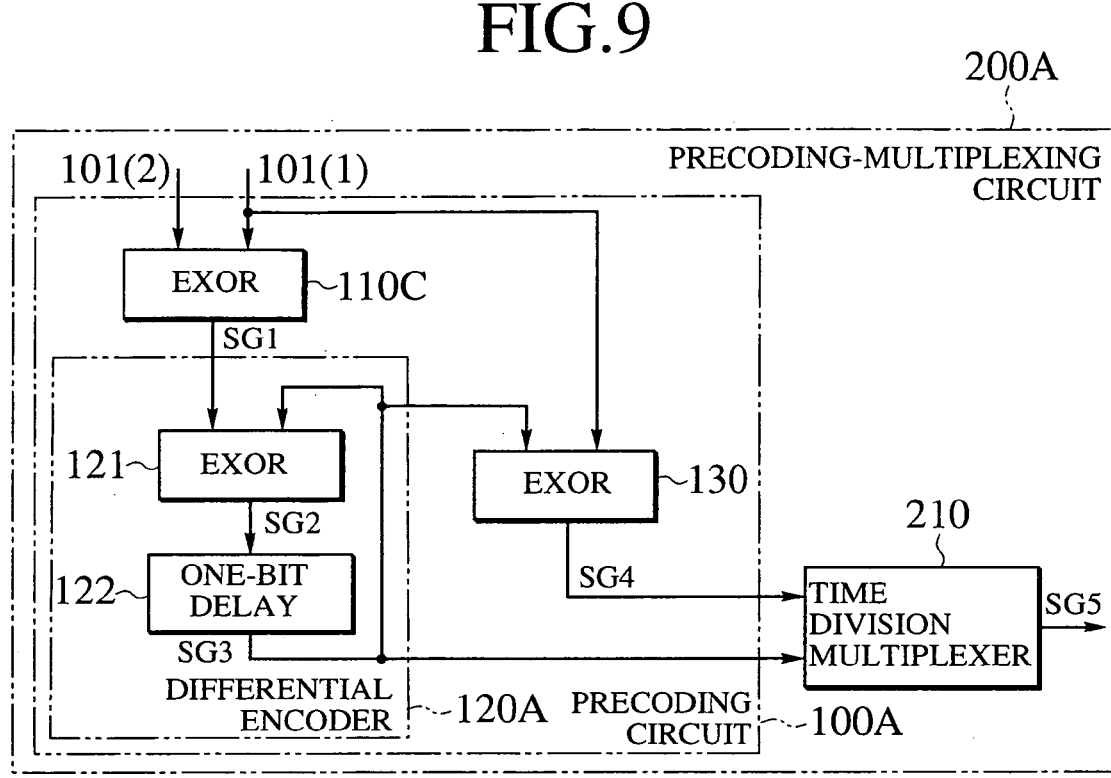
FIG. 9 is a block diagram showing an exemplary configuration of the precoding circuit in the precoding-multiplexing circuit of FIG. 6 for a case of the number of multiplexing n=2.
Figure 10:
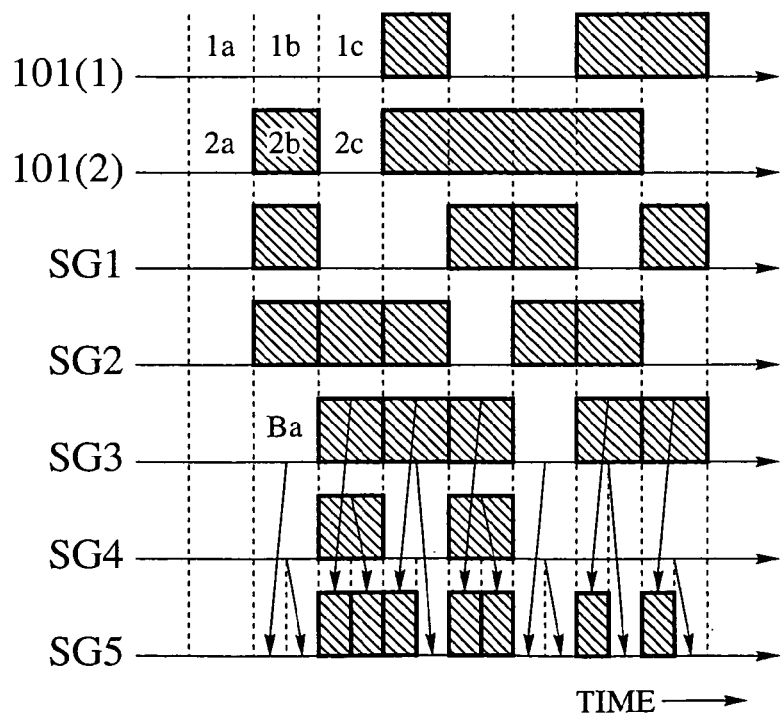
FIG. 10 is a timing chart for exemplary signals in the precoding-multiplexing circuit of FIG. 9.
Figure 11:
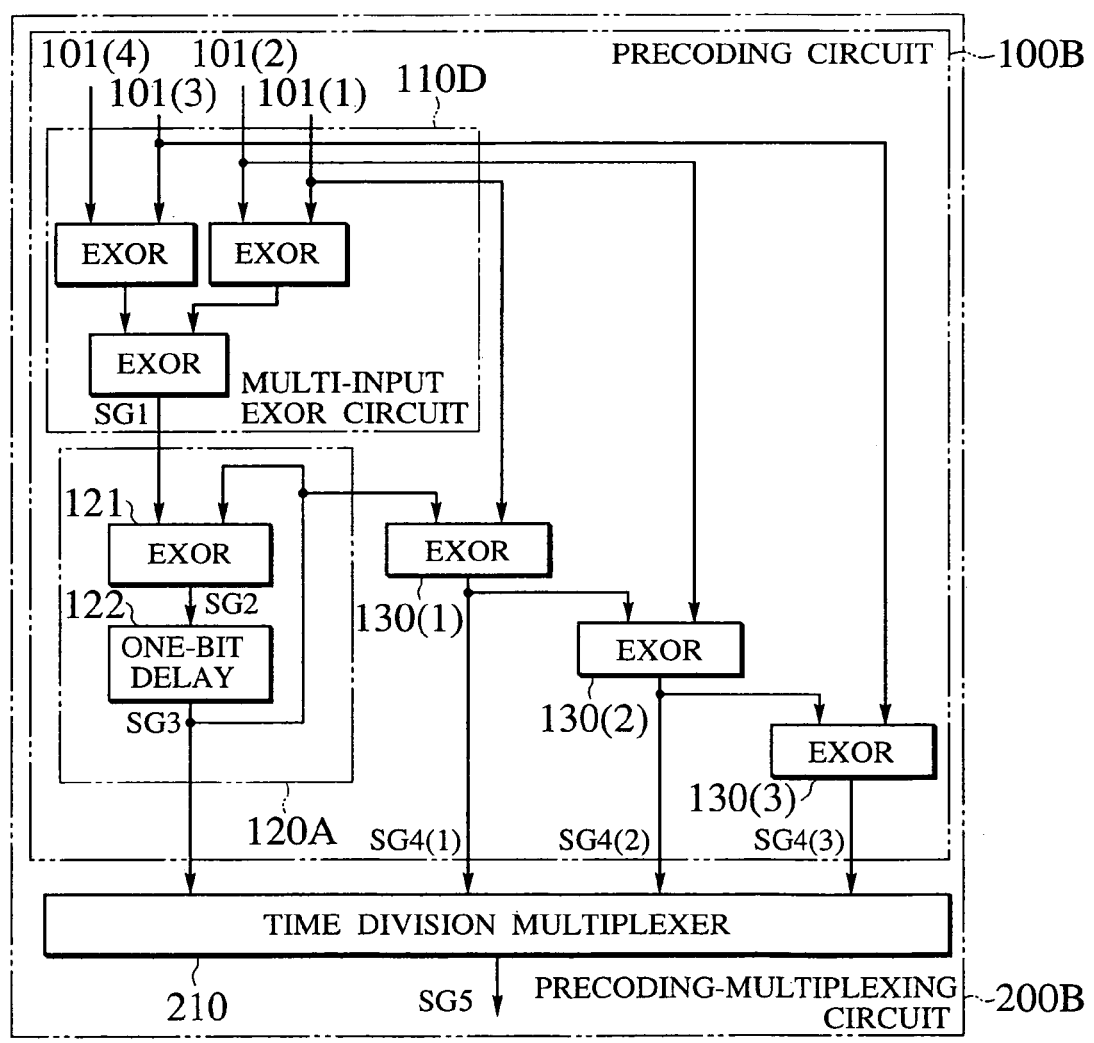
FIG. 11 is a block diagram showing an exemplary configuration of the precoding circuit in the precoding-multiplexing circuit of FIG. 6 for a case of the number of multiplexing n=4.
Figure 12:
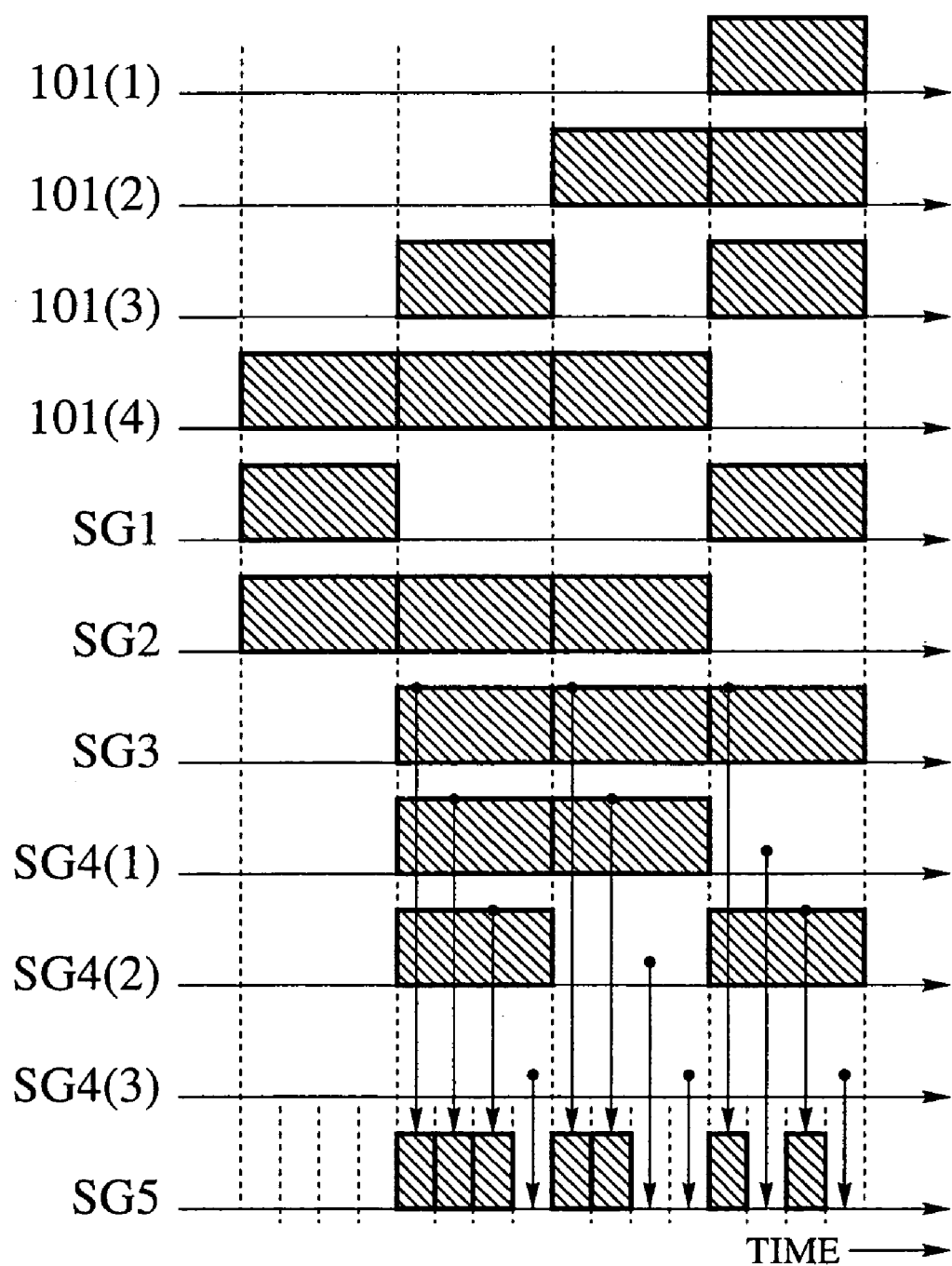
FIG. 12 is a timing chart for exemplary signals in the precoding-multiplexing circuit of FIG. 11.

FIG. 9 shows a configuration of the precoding-multiplexing circuit of the first embodiment in an exemplary case of the number of multiplexing n=2, and FIG. 10 shows exemplary signals in the precoding-multiplexing circuit of FIG. 9. FIG. 11 shows a configuration of the precoding-multiplexing circuit of the first embodiment in an exemplary case of the number of multiplexing n=4, and FIG. 12 shows exemplary signals in the precoding-multiplexing circuit of FIG. 11.

Figure 1:
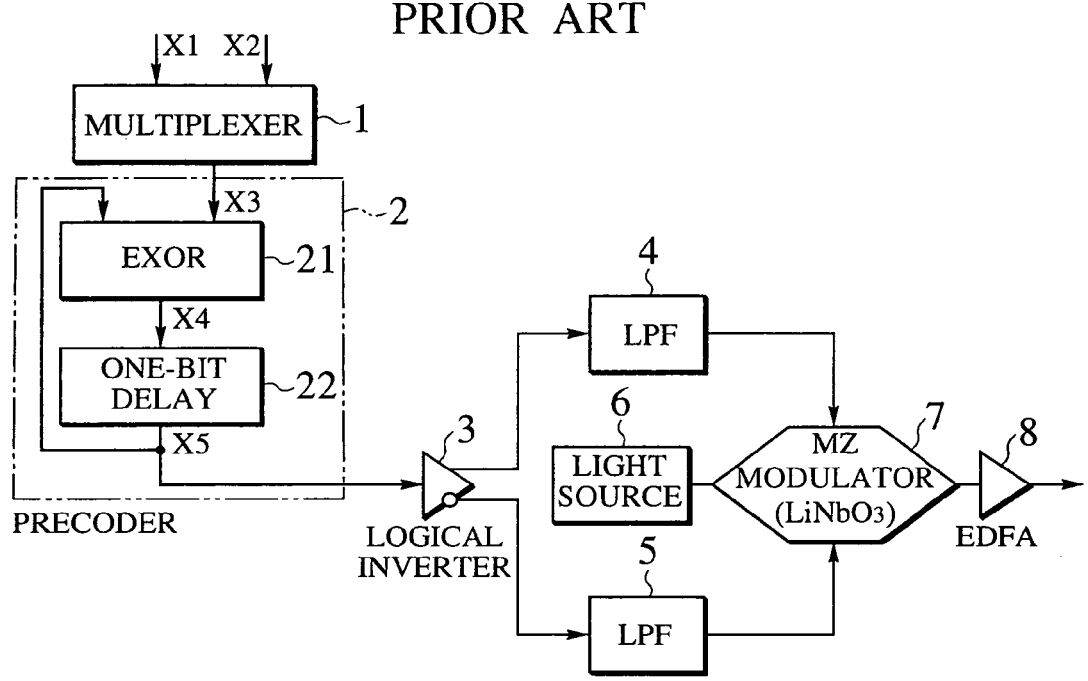
FIG. 1 is a block diagram showing a configuration of a transmitter in a conventional optical duobinary transmission system.
Figure 2:
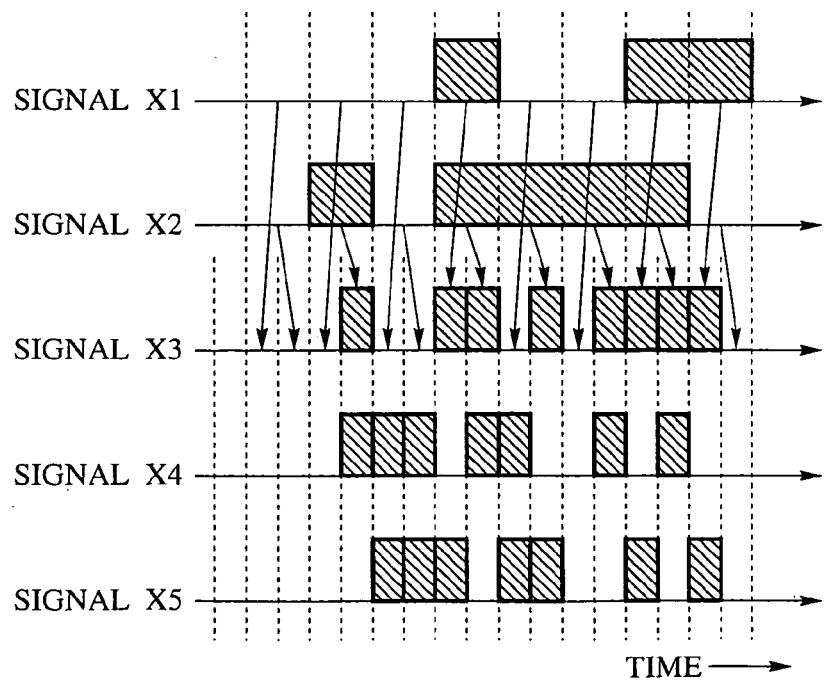
FIG. 2 is a timing chart for an exemplary operation of a multiplexer and a precoder in the transmitter of FIG. 1.
Figure 3:
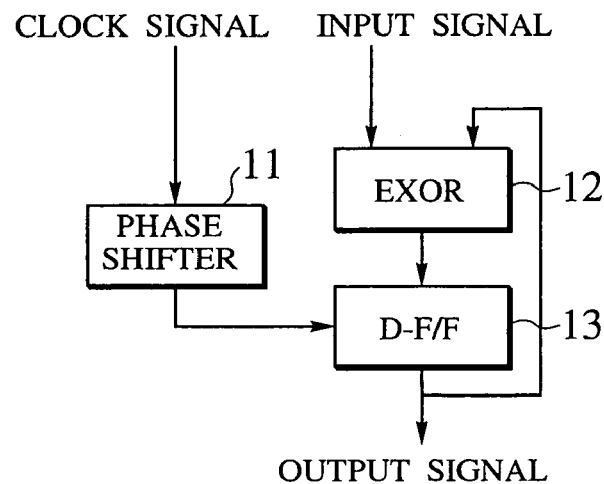
FIG. 3 is a block diagram showing a conventionally known exemplary configuration of a one-bit delay.

In the transmitter shown in FIG. 1, for example, the electric signals that are time division multiplexed and encoded are entered into the logical inverter. Output signals 201 outputted by the precoding-multiplexing circuit 200 of FIG. 6 are similar to the electric signals entered into the logical inverter in FIG. 1. Input signals 101 inputted into the precoding-multiplexing circuit 200 of FIG. 6 correspond to signals X1 and X2 that are entered into the multiplexer in FIG. 1.

In other words, the precoding-multiplexing circuit 200 of FIG. 6 functions similarly as the multiplexer and the precoder shown in FIG. 1. However, the signal processing procedure and the coding content are largely different. In the case of the transmitter of FIG. 1, the signals multiplexed by the multiplexer are processed by the precoder, whereas in the precoding-multiplexing circuit 200 of FIG. 6, the input signals (binary signals) 101 before the multiplexing are precoded by the precoding circuit 100 first, and then the time division multiplexing processing is carried out by the time division multiplexer 210.

The input signals 101 inputted into the precoding circuit 100 are parallel signals in which n sets of binary signals to be multiplexed together are arranged in parallel, where n is the number of multiplexing, so that the bit rate of the input signals 101 is 1/n of the bit rate after the multiplexing (transmission rate).

In other words, the precoding circuit 100 handles electric signals that are slower compared with the transmission rate, so that the precoding circuit 100 can be formed by relatively slow circuit elements. Conversely, when circuit elements as fast as conventional ones are used in the precoding circuit 100, the transmission rate can be increased n times compared with the conventional case.

In the precoding circuit 100, the precoding is carried out such that signals equivalent to the signals entered into the logical inverter in FIG. 1 will be outputted from the time division multiplexer 210 as the output signals 201, for example. The result of this precoding will be outputted from the precoding circuit 100 in forms of n sets of parallel signals.

The n sets of parallel signals outputted by the precoding circuit 100 are entered into the time division multiplexer 210 and time division multiplexed there. Namely, these signals are arranged in a prescribed order in time series and converted into the output signals 201 in a bit rate that is n times higher than that of the input signals 101.

In the case where the number of multiplexing signals is n, the precoding circuit 100 of FIG. 5 has a configuration as shown in FIG. 6. In the configuration of FIG. 6, the precoding circuit 100 comprises a multi-input EXOR circuit 110, a differential encoder 120, and (n−1) sets of EXOR circuits 130.

The n sets of the input signals 101 are all entered into the multi-input EXOR circuit 110, and the exclusive OR of all of the n sets of the input signals 101 is calculated there.

The signal outputted from the multi-input EXOR circuit 110 is then entered into the differential encoder 120. The differential encoder 120 maintains the output logical value with respect to the first logical input value ("0" for example) of its input signal and inverts the output logical value with respect to the second input logical value ("1" for example) of its input signal, and outputs a signal obtained by giving a delay of one time-slot time (one bit time) with respect to the input.

The signal outputted by the differential encoder 120 and the first input signal 101(1) in the time series arrangement order for the multiplexing are entered into two inputs of the first EXOR circuit 130(1).

The signal outputted by the first EXOR circuit 130(1) and the second input signal 101(2) in the time series arrangement order for the multiplexing are entered into two inputs of the second EXOR circuit 130(2).

Similarly, the signal outputted by respective one of the second to (n−2)-th EXOR circuits 130(2) to 130(n−2) and respective one of the third to (n−1)-th input signals in the time series arrangement order for the multiplexing are entered into two inputs of respective one of the third to (n−1)-th EXOR circuit 130(1).

Then, the signal outputted by the differential precoder 120 and the signals respectively outputted by the (n−1) sets of the EXOR circuits 130(1) to 130(n−1) are entered into the time division multiplexer 210 as signals after the precoding. In other words, the n sets of precoded parallel signals are entered into the time division multiplexer 210.

The configuration of the precoding circuit 100 shown in FIG. 6 is based on the following principle. The function required for the precoding to be carried out by the precoding circuit 100 is to set "0" and "1" of the binary data signals to be actually transmitted into correspondence to changes between two neighboring symbols of the output signals.

In other words, the coding is done such that, when the logical value "0" is to be transmitted, "no change" in the symbols is outputted, and when the logical value "1" is to be transmitted, "change" in the symbols is outputted. In order to convert signals that are time division multiplexed in units of one bit into signals to which such a precoding is applied, it is necessary to encode information of the first input signal into a difference between the first output signal and the second output signal, and information of the second input signal into a difference between the second output signal and the third output signal.

Consequently, when the first output signal is determined by some operation, the second, third, . . . , and n-th output signals are uniquely determined from the first, second, . . . , and (n−1)-th output signals and the first, second, . . . , and (n−1)-th input signals, respectively.

On the other hand, the first output signal appears in every n bits in the signal sequence that is multiplexed in units of one bit. In other words, a difference between the symbol at one timing and the symbol at its neighboring time-slot in the first output signal will be affected by all of the first, second, . . . , n-th symbols, so that the difference between the symbol at one timing and the symbol at its neighboring time-slot in the first output signal can be given by the exclusive OR calculation result of all of the first, second, . . . , n-th input signals.

Thus, the desired precoding can be realized by the preceding circuit 100 in the circuit configuration shown in FIG. 6. For the multi-input EXOR circuit 110 used in FIG. 6, either one of the multi-input EXOR circuit 110A shown in FIG. 7 and the multi-input EXOR circuit 110B shown in FIG. 8 can be used.

In the multi-input EXOR circuit 110A shown in FIG. 7, the n sets of the input signals 100(1) to 100(n) are divided into pairs, and the exclusive OR calculation for each pair is carried out by the EXOR circuit 111 on the first column. Then, similarly, the outputs of the EXOR circuits 111 on the first column are divided into pairs again, and the exclusive OR calculation for each pair is carried out by the EXOR circuit 112 on the second column, and so on. The multi-input EXOR circuit 110A has a configuration in which the above described operation is repeated until a single output is eventually obtained.

Note that the pairs can be formed sequentially without producing any residual one all the way down to the end if n is a number in a form of a power of 2, but the residual one for which the pair cannot be formed will appear if n is not a number in a form of a power of 2. In such a case, a pair can be formed by the residual one and the exclusive OR calculation result obtained from two others, and then the exclusive OR calculation for this pair can be carried out subsequently.

In the multi-input EXOR circuit 110B shown in FIG. 8, arbitrary two of the n sets of the input signals 101(1) to 101(n) are selected first, and the exclusive OR calculation of these two is carried out by the first EXOR circuit 115(1). Then, the exclusive OR calculation for the output of the first EXOR circuit 115(1) and another one input signal is carried out by the second EXOR circuit 115(2), the exclusive OR calculation for the output of the second EXOR circuit 115(2) and still another one input signal is carried out by the third EXOR circuit 115(3), and so on. The multi-input EXOR circuit 110B has a configuration in which the above described operation is repeated until a single output is eventually obtained.

Note that the configurations shown in FIG. 7 and FIG. 8 are only examples, and in general it is possible to realize the multi-input EXOR circuit 110 by any suitable combination of these configurations. For example, if n is not a number in a form of a power of 2, the configuration can be correspondingly modified as described above. In any case, it is possible to form the multi-input EXOR circuit 110 using (n−1) sets of EXOR circuits.

In the case where the number of multiplexing signals n=2, the precoding-multiplexing circuit 200 of FIG. 6 can be provided in a configuration shown in FIG. 9. The precoding-multiplexing circuit 200A shown in FIG. 9 operates as shown in FIG. 10. Note that the delay time of the circuit elements other than a one-bit delay 122 is ignored in FIG. 10. Also, in FIG. 10, regions of the signals for the logical value "1" are depicted as hatched regions, while regions of the signals for the logical value "0" are depicted as blank regions.

In this exemplary case, the number n of the input signals 101 is 2, so that the precoding circuit 100A of FIG. 9 uses an EXOR circuit 110C in place of the multi-input EXOR circuit 110 of FIG. 6. The differential encoder 120A is formed by an EXOR circuit 121 and a one-bit delay 122. Here, the one-bit delay 122 delays the signal for one bit time. In order to feedback the signal, the output of the one-bit delay 122 is connected to one of the inputs of the EXOR circuit 121.

In the precoding circuit 110A of FIG. 9, if two input signals 101(1) and 101(2) have the identical symbol (the logical value "0" and the logical value "0", or the logical value "1" and the logical value "1"), the signal SG1 outputted by the EXOR circuit 110C remains at the logical value "0", and the signal SG3 to be outputted by the one-bit delay 122 also maintains its initial state.

This operation is equivalent to that of the conventional precoder shown in FIG. 1, for example, in which the output is obtained as the original logical level from the logical level in some initial state through a process of "maintain" & "maintain" with respect to the sequence "0", "0", or a process of "invert" & "invert" with respect to the sequence "1", "1".

Also, in the precoding circuit 100A of FIG. 9, if two input signals 101(1) and 101(2) have mutually different symbols (the logical value "0" and the logical value "1", or the logical value "1" and the logical value "0"), the signal SG1 outputted by the EXOR circuit 110C becomes the logical value "1", and the signal SG3 to be outputted by the one-bit delay 122 is inverted.

This operation is equivalent to that of the conventional precoder shown in FIG. 1, for example, in which the output is obtained as an inverted state from some initial state through a process of "maintain" & "invert" with respect to the sequence "0", "1", or a process of "invert" & "maintain" with respect to the sequence "1", "0".

At the same time, the EXOR circuit 130 calculates the exclusive OR of the signal SG3 outputted by the differential encoder 120A and the input signal 101(1). If the input signal 101(1) has the logical value "0", a signal identical to the signal SG3 will appear as a signal SG4, and if the input signal has the logical value "1", a signal obtained by inverting the logical value of the signal SG3 will appear as a signal SG4.

Namely, as shown in FIG. 10, for example, starting from an initial state of the signal SG3 with the logical value "Ba" obtained from bits 1a and 2a, whether the logical level of the signal SG4 is to be maintained or inverted is determined according to whether the next bit 1b is "0" or "1".

The two signals SG3 and SG4 outputted by the precoding circuit 100A by the above described operation are then time division multiplexed by the time division multiplexer 210, so as to realize the coding equivalent to the precoder of FIG. 1.

In this way, the precoding of all bits is completed by shifting the sequence of bits to be processed from a bit pair 1a and 2a to a bit pair 1b and 2b.

Thus, in the precoding-multiplexing circuit 200A of FIG. 9, it is possible to carry out the precoding that equivalently corresponds to the transmission rate despite of the fact that the precoding circuit 100A is operated at the bit rate which is ½ of the transmission rate. Consequently, the operation bit rate required for the precoding circuit 100A is reduced to ½ of the transmission rate.

In the case where the number of multiplexing signals n= 4, the precoding-multiplexing circuit 200 of FIG. 6 can be provided in a configuration shown in FIG. 11. The precoding-multiplexing circuit 200B shown in FIG. 11 operates as shown in FIG. 12. Note that the delay time of the circuit elements other than a one-bit delay 122 is ignored in FIG. 12. Also, in FIG. 12, regions of the signals for the logical value "1" are depicted as hatched regions, while regions of the signals for the logical value "0" are depicted as blank regions.

In this exemplary case, the number n of the input signals 101 is 4, so that the multi-input EXOR circuit 110 of FIG. 6 is formed by three EXOR circuits. The differential encoder 120A is formed similarly as in FIG. 9. The precoding circuit 100B of FIG. 11 comprises the multi-input EXOR circuit 110D, the differential encoder 120A and three EXOR circuits 130. Four parallel input signals 101(1) to 101(4) in the bit rate which is ¼ of the transmission rate are entered at the inputs of the precoding circuit 100B of FIG. 11.

The multi-input EXOR circuit 110D calculates the exclusive OR of all of the four parallel input signals 101(1) to 101(4) and outputs the calculation result as a signal SG1. The result of the differential encoding on this signal SG1 is then outputted from the differential encoder 120A as a signal SG3.

Similarly as in the precoding circuit 100A of FIG. 6, the EXOR circuit 130(1) calculates the exclusive OR of the signal SG3 and the first input signal 101(1), and outputs the calculation result as a signal SG4(1). The EXOR circuit 130(2) calculates the exclusive OR of the signal SG4(1) and the second input signal 101(2), and outputs the calculation result as a signal SG4(2). The EXOR circuit 130(3) calculates the exclusive OR of the signal SG4(2) and the third input signal 101(3), and outputs the calculation result as a signal SG4(3).

The time division multiplexer 210 arranges four signals SG3, SG4(1), SG4(2), and SG4(3) in order and time division multiplex them, and outputs the obtained result as a signal SG5. As can be seen from the exemplary operation shown in FIG. 12, the signal SG5 outputted by the precoding-multiplexing circuit 200B of FIG. 11 is equivalent to the signal outputted by the conventional precoder.

Thus, in the precoding-multiplexing circuit 200B of FIG. 11, it is possible to carry out the precoding that equivalently corresponds to the transmission rate despite of the fact that the precoding circuit 100B is operated at the bit rate which is ¼ of the transmission rate. Consequently, the operation bit rate required for the preceding circuit 100B is reduced to ¼ of the transmission rate.

Figure 13:
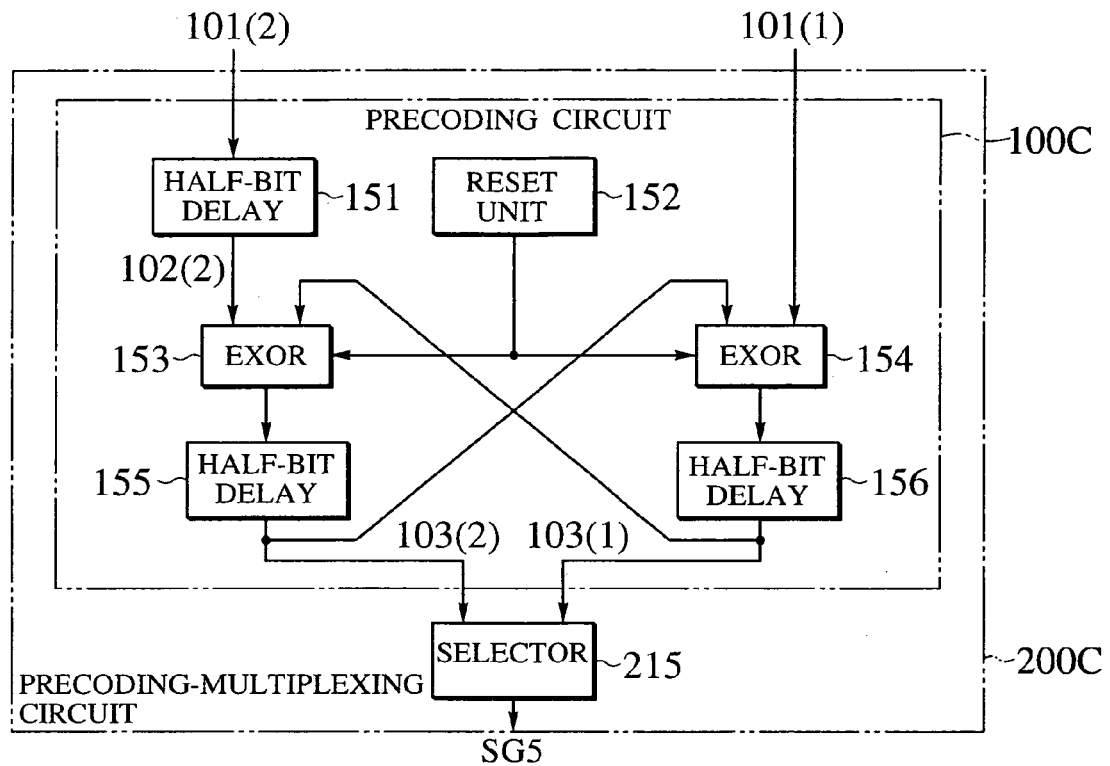
FIG. 13 is a block diagram showing a configuration of a precoding-multiplexing circuit according to the second embodiment of the present invention.
Figure 14:
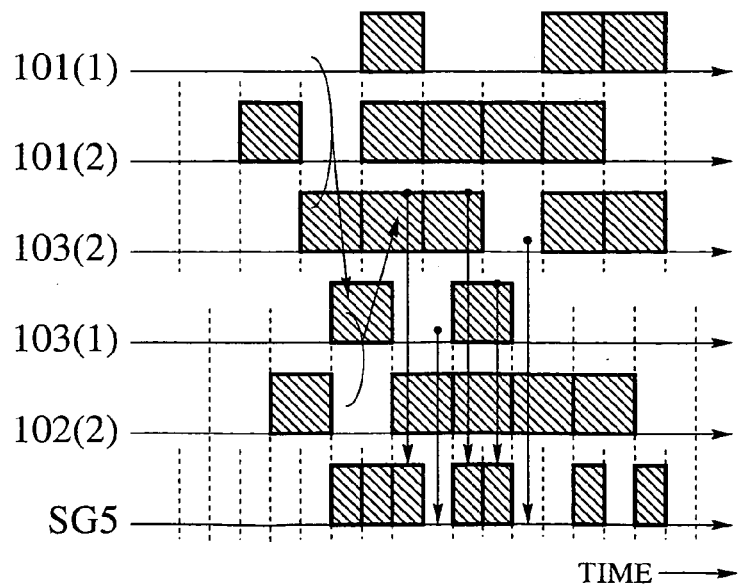
FIG. 14 is a timing chart for exemplary signals in the precoding-multiplexing circuit of FIG. 13.

Referring now to FIG. 13 and FIG. 14, the second embodiment of a preceding circuit and a precoding-multiplexing circuit according to the present invention will be described in detail.

FIG. 13 shows a configuration of the precoding-multiplexing circuit of the second embodiment, and FIG. 14 shows exemplary signals in the precoding-multiplexing circuit of FIG. 13. Note that the delay time of the circuit elements other than half-bit delays 151, 155 and 156 of FIG. 13 is ignored in FIG. 14.

The input signals 101 to be entered into the precoding-multiplexing circuit 200C shown in FIG. 13 are two parallel binary signals in the bit rate that is ½ of the transmission rate. Namely, two signals before the time division multiplexing are entered as parallel input signals 101(1) and 101(2).

The precoding-multiplexing circuit 200C of FIG. 13 comprises a preceding circuit 100C and a selector 215. The selector 215 has the same function as the time division multiplexer 210 of the first embodiment.

As shown in FIG. 14, the selector 215 outputs a result of alternately selecting one of the two signals 103(1) and 103(2) outputted by the preceding circuit 100C in a prescribed order, as a signal SG5. The bit rate of the signal SG5 is the same as the transmission rate, which is twice the bit rate of the input signals 101.

The precoding circuit 100C of FIG. 13 comprises a half-bit delay 151, a reset unit 152, EXOR circuits 153 and 154, and half-bit delays 155 and 156.

Each of the half-bit delays 151, 155 and 156 outputs a signal obtained by delaying its input signal for ½ bit time.

The input signal 101(1) is directly entered into one of the inputs of the EXOR circuit 154, while a signal 102(2) obtained by delaying the input signal 101(2) for ½ bit time by the half-bit delay 151 is entered into one of the inputs of the EXOR circuit 153. Consequently, there is a half bit phase difference between the signal 101(1) entered into the EXOR circuit 154 and the signal 102(2) entered into the EXOR circuit 153.

The signal outputted by the EXOR circuit 154 is delayed for ½ bit time by the half-bit delay 156, and entered into another input of the EXOR circuit 153. Also, the signal outputted by the EXOR circuit 153 is delayed for ½ bit time by the half-bit delay 155, and entered into another input of the EXOR circuit 154.

The reset unit 152 outputs a signal for resetting the initial states of the outputs of the two EXOR circuits 153 and 154 to an identical state. For example, the initial states of the outputs can be made identical as the reset unit 152 sets the voltage of the current sources of the EXOR circuits 153 and 154 equal to 0.

Because there is a half bit phase difference between the signal 103(1) outputted from the half-bit delay 156 and the signal 103(2) outputted from the half-bit delay 155, it is possible to realize the time division multiplexing into the signal SG5 in the same bit rate as the transmission rate by entering these signals directly into the selector 215.

Thus the precoding-multiplexing circuit 200C shown in FIG. 13 can fulfill the same function as the precoding-multiplexing circuit 200A of FIG. 9. For example, as can be seen by comparing FIG. 14 with FIG. 10, the input signals 101(1) and 101(2) and the output signal SG5 are identical in the precoding-multiplexing circuit 200C of FIG. 13 and the precoding-multiplexing circuit 200A of FIG. 9. Also, the signal SG5 outputted by the precoding-multiplexing circuit 200C is equivalent to the signal outputted by the conventional precoder.

The precoding circuit 100C of FIG. 13 handles signals 101, 102 and 103 with the bit rate that is ½ of the transmission rate, so that the precoding circuit 100C can be formed by relatively slow circuit elements. Conversely, when circuit elements as fast as conventional ones are used in the precoding circuit 100C, the transmission rate can be increased twice compared with the conventional case.

In addition, the precoding-multiplexing circuit 200C of FIG. 13 has a better circuit symmetry so that it is easy to determine a layout at a time of forming this circuit by IC.

Moreover, because of a half bit phase difference between the output signals of the precoding circuit 100C, it is possible to realize the time division multiplexing by using a circuit such as a selector directly on these output signals.

Furthermore, because of the reset unit provided in the preceding circuit 100C, it is possible to prevent abnormal operations efficiently.

Figure 15:
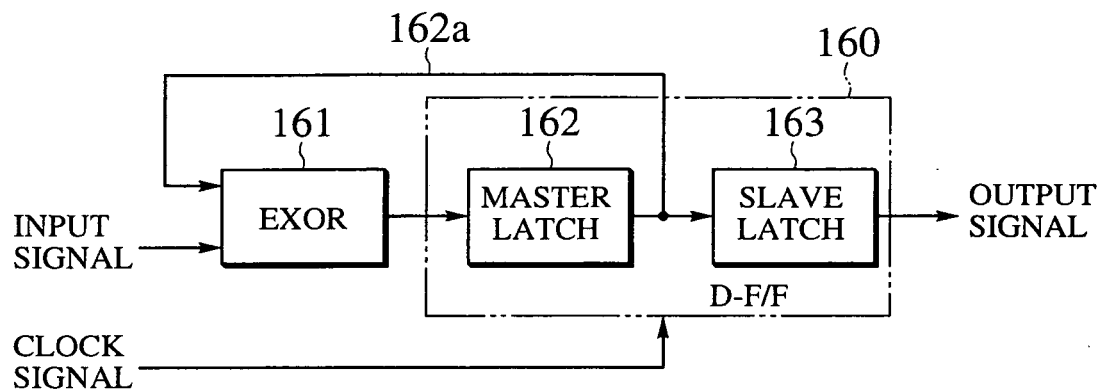
FIG. 15 is a block diagram showing a configuration of a precoding circuit according to the third embodiment of the present invention.
Figure 16:
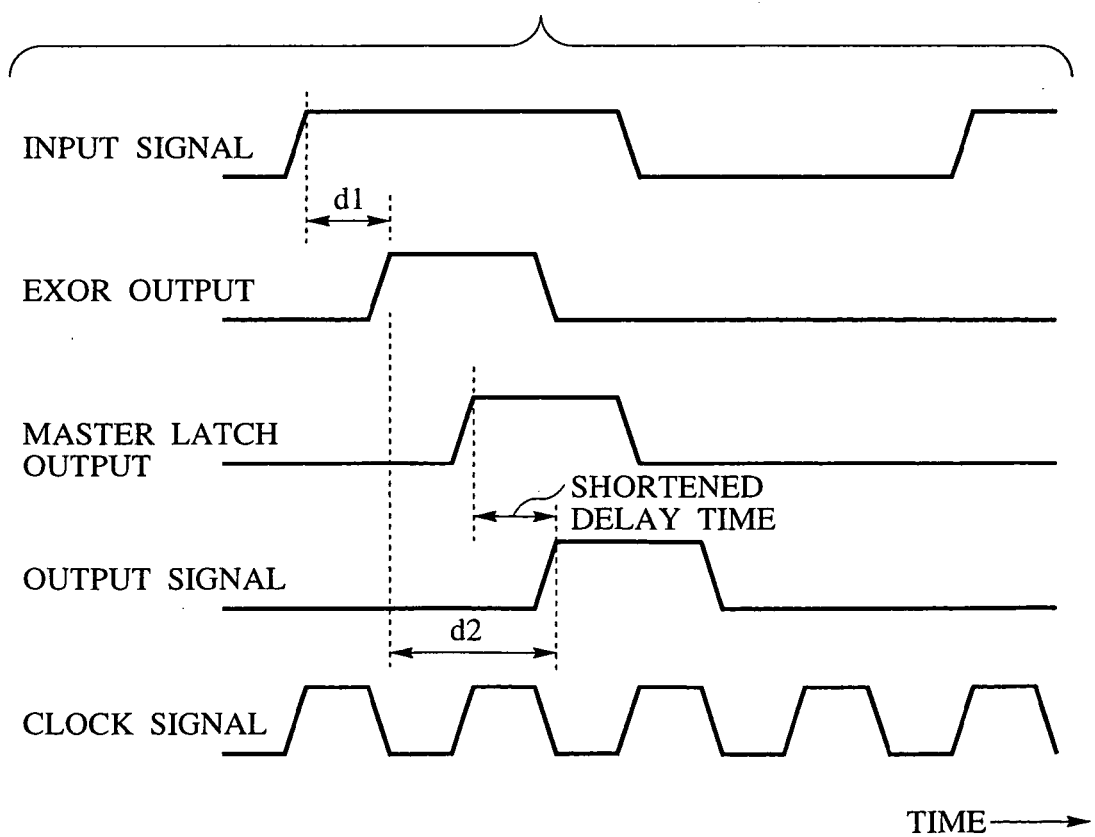
FIG. 16 is a timing chart for exemplary signals in the precoding circuit of FIG. 15.

Referring now to FIG. 15 and FIG. 16, the third embodiment of a precoding circuit according to the present invention will be described in detail.

FIG. 15 shows a configuration of the preceding circuit of the third embodiment, and FIG. 16 shows exemplary signals in the precoding circuit of FIG. 15.

The precoding circuit of FIG. 15 fulfills the same function as the conventional precoder of FIG. 1. However, the precoding circuit of FIG. 15 has a configuration which is devised to shorten the internal delay time.

In FIG. 15, a D-type flip-flop 160 connected to an output of an EXOR circuit 161 realizes the one bit time delay.

As shown in FIG. 16, there is a time lag of about one period of the clock signal between the input (EXOR output) and the output (output signal) of the D-type flip-flop 160. When the propagation delay of the circuit becomes unignorable compared with a time-slot of one bit due to the increase of the transmission rate, there is a possibility for a delay time required for the feedback to the EXOR circuit 161 to exceed the one time-slot time.

As shown in FIG. 16, in response to the first "1" bit of the input signal, the EXOR circuit 161 inverts the logical value of the output signal (EXOR output) from "0" to "1" after an internal delay time d1. Also, a delay time d2 is required at the D-type flip-flop 160 since reading the signal outputted by the EXOR circuit 161 until outputting it.

The D-type flip-flop 160 is generally called master-slave type, which has a two-stage internal configuration formed by a master latch 162 and a slave latch 163. When the clock signal is "0", the master latch 162 reads the input, and at an instance of the transition of the clock signal from "0" to "1", the logical level determined inside the master latch 162 is read into the slave latch 163 while the output of the D-type flip-flop 160 is rewritten and the rewritten information is maintained until the clock signal becomes "1" state next. Consequently, the delay time d2 inevitably includes a delay of a half period of the clock required for the D-type flip-flop 160 since reading the input until rewriting, in addition to the propagation delay of the circuit itself.

Figure 4:
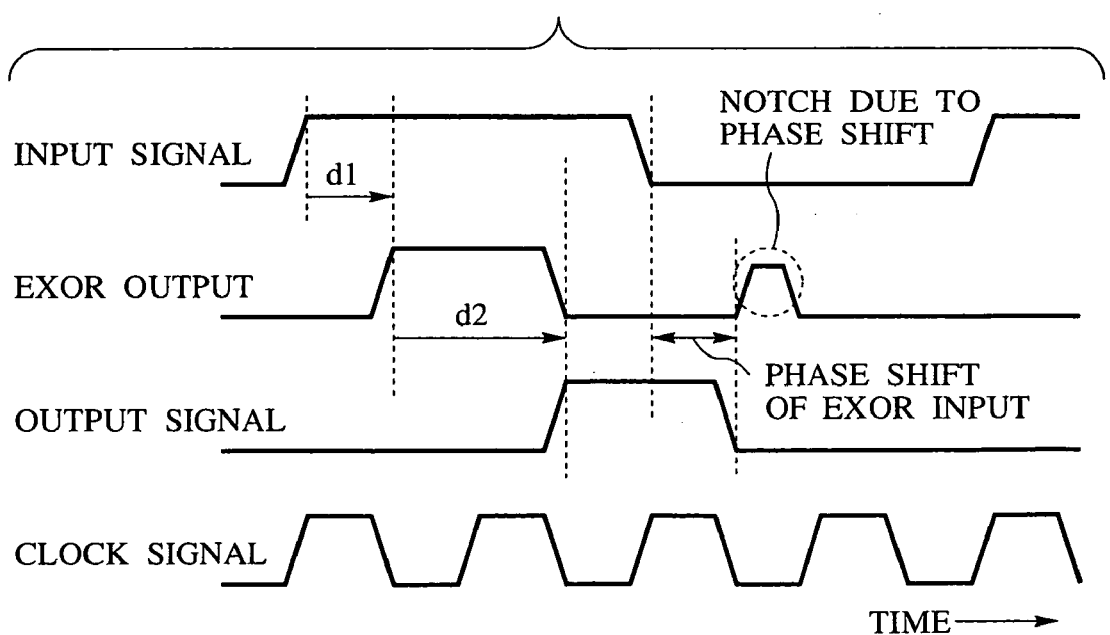
FIG. 4 is a timing chart for an exemplary operation of the one-bit delay of FIG. 3.

In order for the precoder circuit to realize the one-bit delay, it is necessary for a sum of the above described delay times d1 and d2 to coincide with the one-bit delay time. However, when the total delay time exceeds the one-bit delay due to the increase of the transmission rate, the phase shift of signals at the input terminal of the EXOR circuit occurs and this in turn causes an operation error due to the occurrence of a notch in the output signal of the EXOR circuit as shown in FIG. 4.

For this reason, the precoding circuit of FIG. 15 has a configuration in which the signal 162a outputted by the master latch 162 inside the D-type flip-flop 160 is taken out and fed back to the input of the EXOR circuit 161.

As shown in FIG. 16, the signal 162a outputted by the master latch 162 has a delay time which is shorter by a half period of the clock signal than the output signal of the D-type flip-flop 160, so that by feeding back this signal 162a it is possible to reduce the influence of the delay time within the D-type flip-flop 160 considerably. Namely, even when the transmission rate is further increased, it becomes possible to prevent the total delay time of the one-bit delay from exceeding the one-bit delay time.

Apart from its use in place of the conventional precoder, the preceding circuit of FIG. 15 can also be used in various circuits that require one-bit delay. For instance, the differential encoder 120, 120A shown in FIGS. 6, 9 and 11 may be replaced by the precoding circuit of FIG. 15.

Referring now to FIG. 17 to FIG. 21, the fourth embodiment of a precoding circuit according to the present invention will be described in detail.

Figure 17:
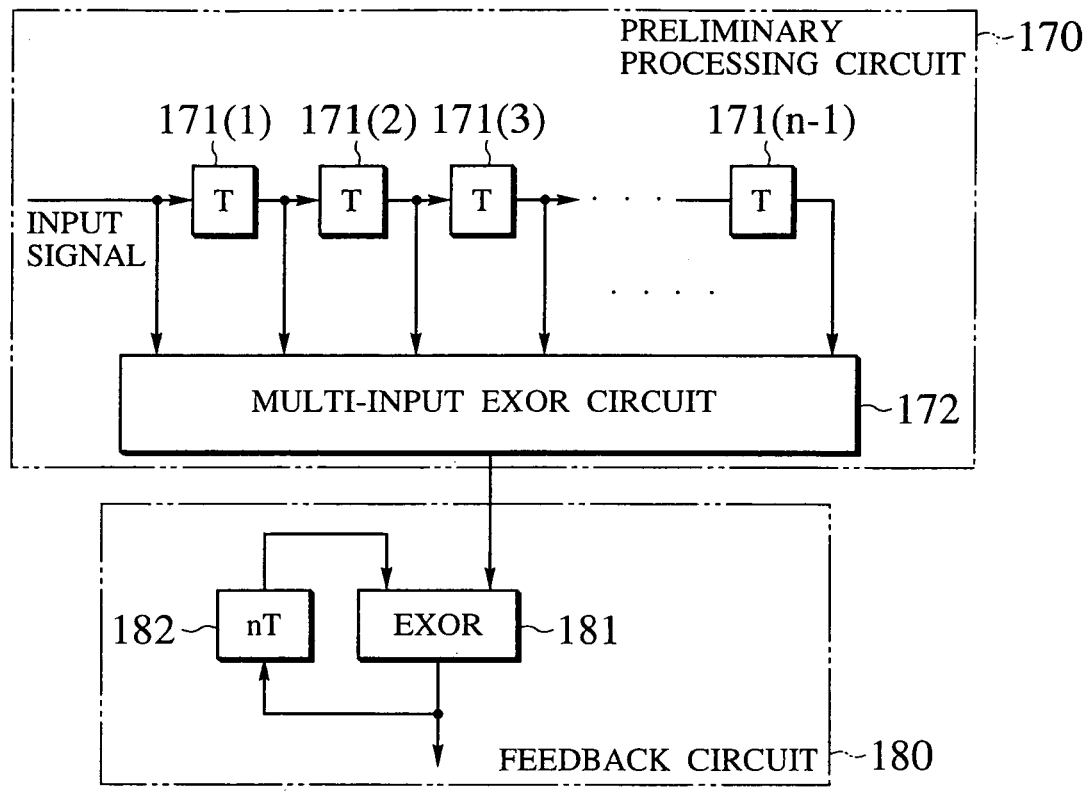
FIG. 17 is a block diagram showing a configuration of a precoding circuit according to the fourth embodiment of the present invention.
Figure 18:
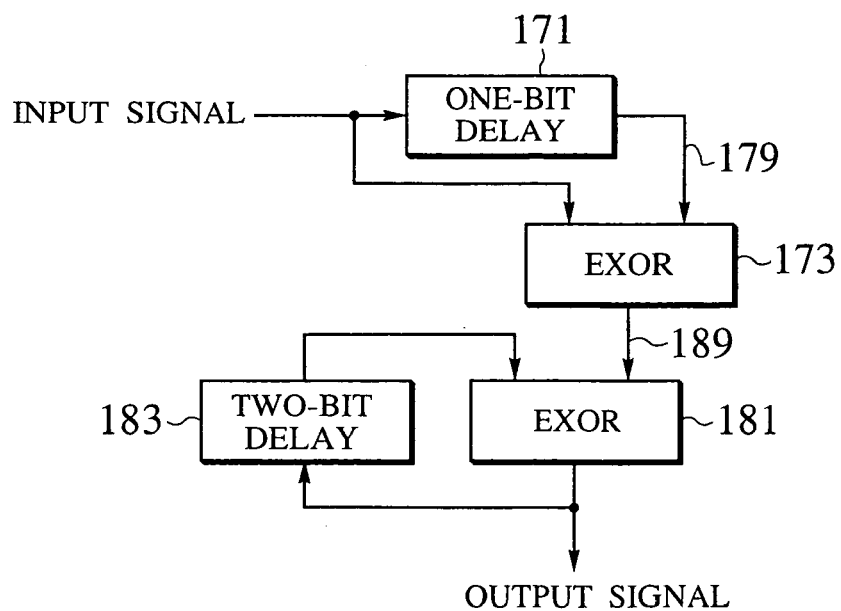
FIG. 18 is a block diagram showing an exemplary configuration of the precoding circuit of FIG. 17 for a case of the number of multiplexing n=2.
Figure 19:
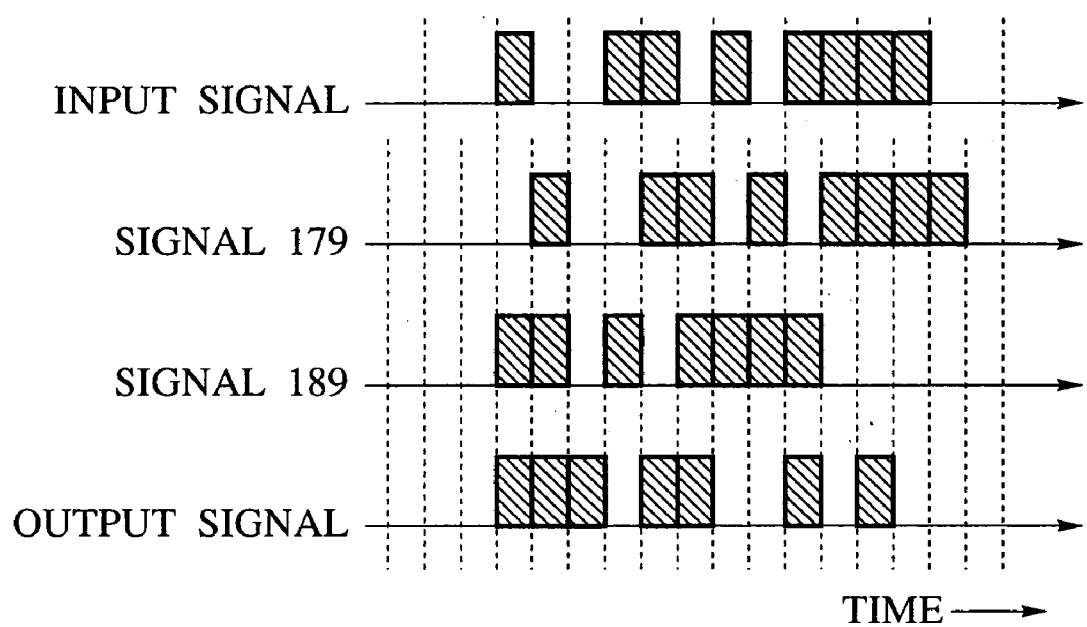
FIG. 19 is a timing chart for exemplary signals in the precoding circuit of FIG. 18.
Figure 20:
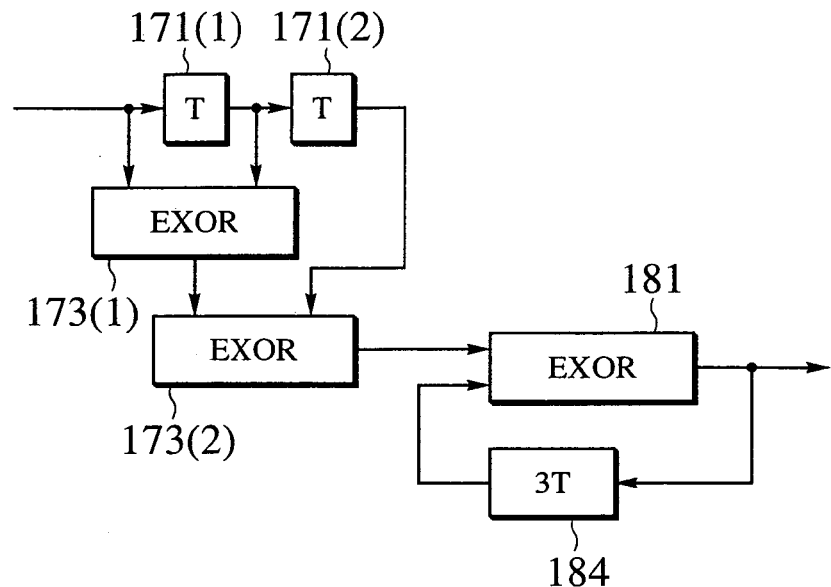
FIG. 20 is a block diagram showing an exemplary configuration of the preceding circuit of FIG. 17 for a case of the number of multiplexing n=3.
Figure 21:
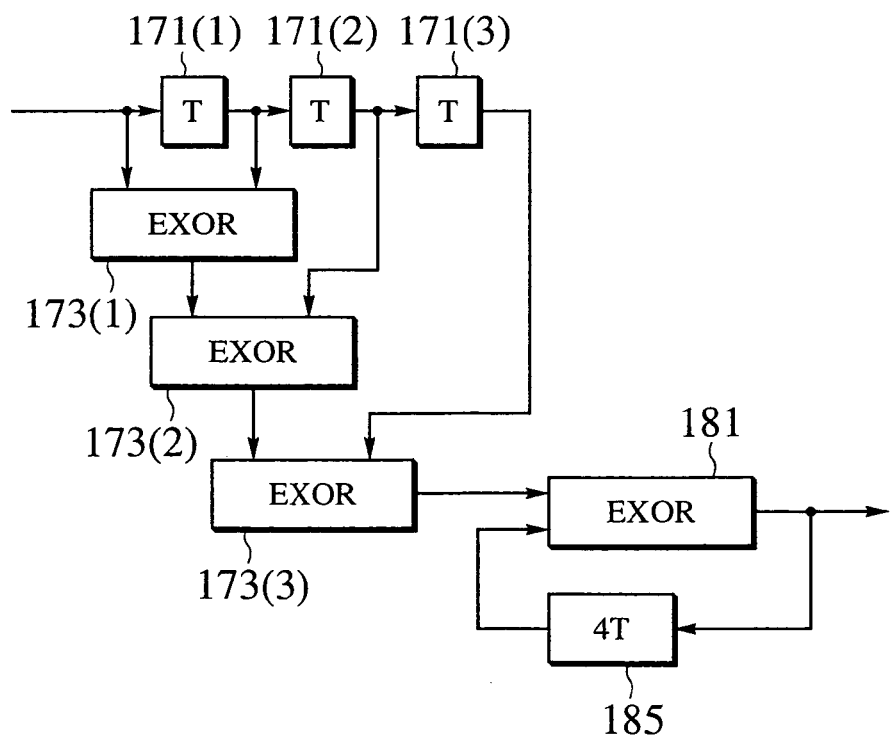
FIG. 21 is a block diagram showing an exemplary configuration of the precoding circuit of FIG. 17 for a case of the number of multiplexing n=4.

FIG. 17 shows a configuration of the precoding circuit of the fourth embodiment, FIG. 18 shows one exemplary configuration of the preceding circuit of FIG. 17 for an exemplary case of n=2, and FIG. 19 shows exemplary signals in the precoding circuit of FIG. 18. FIG. 20 shows another exemplary configuration of the precoding circuit of FIG. 17 for an exemplary case of n=3, and FIG. 21 shows still another exemplary configuration of the precoding circuit of FIG. 17 for an exemplary case of n=4.

The precoding circuit shown in FIG. 17 comprises a preliminary processing circuit 170 and a feedback circuit 180. The preliminary processing circuit 170 comprises (n−1) sets of one-bit delays (T) 171 and a multi-input EXOR circuit 172. The feedback circuit 180 comprises an EXOR circuit 181 and an n-bit delay (nT) 182.

An input signal entered into the preliminary processing circuit 170 is sequentially delayed for one bit time by each one of the (n−1) sets of the one-bit delays 171. The input signal of the preliminary processing circuit 170 and signals outputted by the (n−1) sets of the one-bit delays 171 are entered into the multi-input EXOR circuit 172 where the exclusive OR of all these entered signals is calculated.

The n-bit delay 182 of the feedback circuit 180 delays the signal outputted by the EXOR circuit 181 for n bit time, and enters the delayed signal into an input of the EXOR circuit 181. The EXOR circuit 181 calculates the exclusive OR of the signal outputted by the multi-input EXOR circuit 172 of the preliminary processing circuit 170 and the signal outputted by the n-bit delay 182.

The precoding circuit of FIG. 17 can be used in place of the conventional precoder, or in place of the differential encoder 120, 120A of FIGS. 6, 9 and 11.

In general, in this type of circuit it becomes difficult to realize the one bit time delay in the feedback circuit when the signal bit rate becomes high.

However, in the precoding circuit shown in FIG. 17, the delay time required at the feedback circuit 180 is expanded to n times the one bit time by combining the preliminary processing circuit 170 and the feedback circuit 180. For this reason, the n-bit delay 182 is provided instead of the conventionally used one-bit delay in the feedback circuit 180. The n-bit delay 182 carries out the time delay which is n times that of the one-bit delay and which can be relatively easily realized even when the bit rate is further increased. Consequently, when the circuit elements of the same bit rate are used, the precoding circuit of FIG. 17 can handle the higher transmission rate than the conventional precoder.

The precoding circuit of FIG. 17 has a configuration based on the principle that, in order to determine a next signal from a current signal and an n-bit prior signal, it suffices to determine in advance whether a signal state is "maintained" or "inverted" over a period between the n-bit prior timing and the current timing.

The multi-input EXOR circuit 172 shown in FIG. 17 can be realized by a circuit shown in FIG. 7 or FIG. 8, for example.

When n=2 in FIG. 17, the precoding circuit of FIG. 17 can be realized as shown in FIG. 18, and this precoding circuit of FIG. 18 operates as shown in FIG. 19. Note that the signal delay of the EXOR circuits 173 and 181 is ignored in FIG. 19.

In the precoding circuit of FIG. 18, the input signal is split into two, and one of the split input signals is entered into the EXOR circuit 173. Another one of the split input signals is delayed for one bit time by the one-bit delay 171, and a delayed signal 179 outputted from the one-bit delay 171 is entered into the EXOR circuit 173. A signal 189 outputted from the EXOR circuit 173 is entered into the EXOR circuit 181. A signal outputted by the EXOR circuit 181 is fed back to an input of the EXOR circuit 181 through a two-bit delay 183 that applies two bit time delay.

The precoded signal is then outputted from the EXOR circuit 181. As can be seen from FIG. 19, this output signal is equivalent to the signal outputted by the conventional precoder shown in FIG. 1.

Similarly as inr17 can be realized even in the case where n is different from 2. For example, when n=3, the preceding circuit of FIG. 17 can be realized as shown in FIG. 20, and when n=4, the precoding circuit of FIG. 17 can be realized as shown in FIG. 21.

In FIG. 20, the preliminary processing circuit 170 of FIG. 17 is formed by two one-bit delays 171(1) and 171(2) and two EXOR circuits 173(1) and 173(2). Also, the feedback circuit 180 of FIG. 17 is formed by an EXOR circuit 181 and a three-bit delay (3T) 184. The three-bit delay 184 feeds back the signal delayed for a time corresponding to three bits to an input of the EXOR circuit 181.

In FIG. 21, the preliminary processing circuit 170 of FIG. 17 is formed by three one-bit delays 171(1), 171(2) and 171(3) and three EXOR circuits 173(1), 173(2) and 173(3). Also, the feedback circuit 180 of FIG. 17 is formed by an EXOR circuit 181 and a four-bit delay (4T) 185. The four-bit delay 185 feeds back the signal delayed for a time corresponding to four bits to an input of the EXOR circuit 181.

Figure 22:
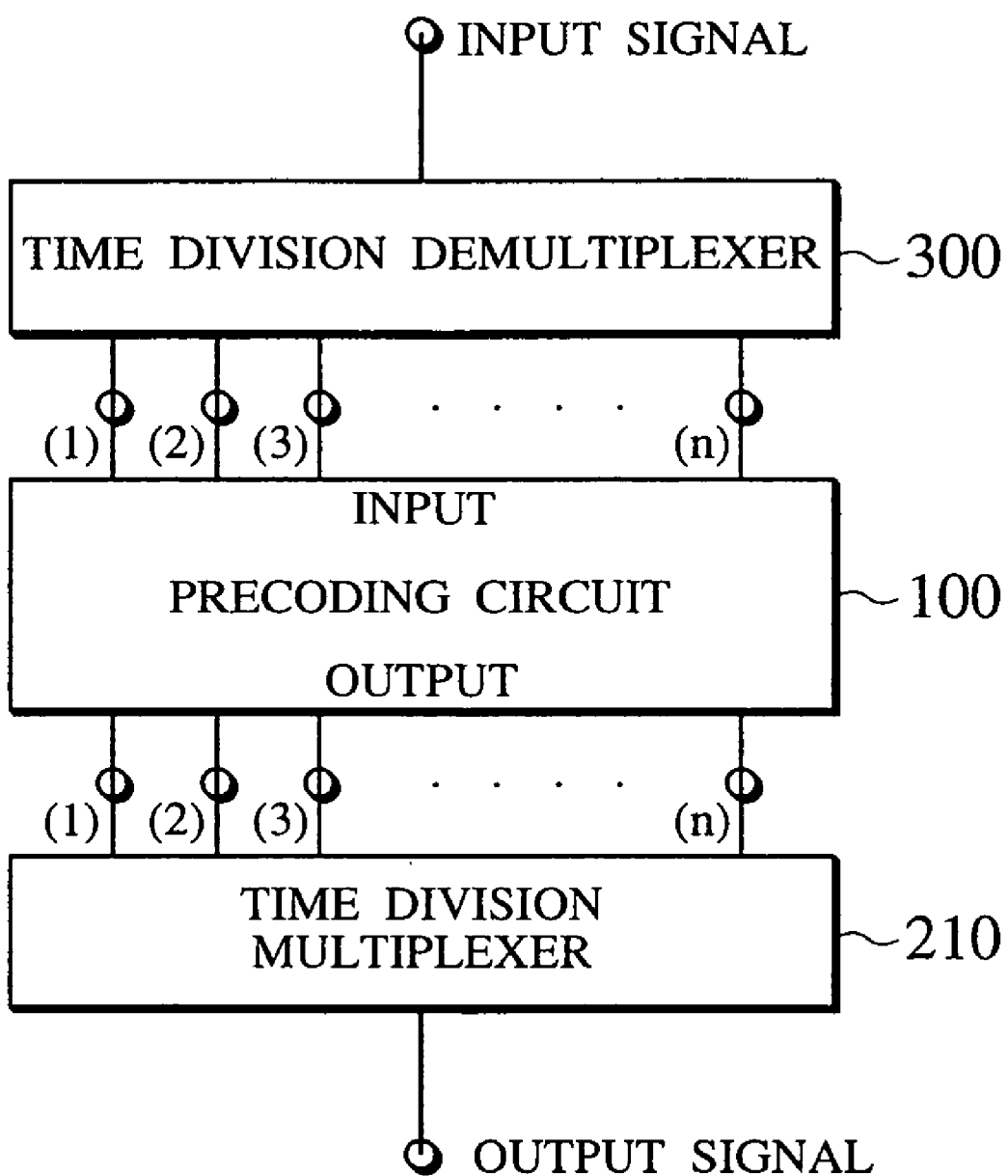
FIG. 22 is a block diagram showing a schematic configuration of a precoding-multiplexing circuit according to the fifth embodiment of the present invention.

Referring now to FIG. 22, the fifth embodiment of a precoding circuit and a precoding-multiplexing circuit according to the present invention will be described in detail.

FIG. 22 shows a configuration of the precoding-multiplexing circuit of the fifth embodiment. In FIG. 22, the precoding circuit 100 and the time division multiplexer 210 are the same as the precoding circuit 100 and the time division multiplexer 210 shown in FIG. 5. In other words, the precoding-multiplexing circuit of FIG. 22 is obtained by connecting a time division demultiplexer 300 at an input of the preceding circuit 100 of FIG. 5.

The time division demultiplexer 300 of FIG. 22 has an input signal having the same bit rate as the time division multiplexed signals, demultiplexes this input signal into n sets of signals in a state before multiplexing, and outputs these n sets of signals. Consequently, when the time division multiplexed signals are entered into the time division demultiplexer 300, the n parallel signals in a state before multiplexing are entered into the input of the precoding circuit 100. These n paralle signals have the bit rate which is 1/n of the transmission rate.

Consequently, it suffices for the preceding circuit 100 to process signals which are slower compared with the transmission rate, so that it is possible to handle the high transmission rate similarly as in the case of FIG. 5. Also, the precoding-multiplexing circuit of FIG. 22 can use the time division multiplexed signals as its inputs, so that it is also possible to use this precoding-multiplexing circuit in place of the precoder of FIG. 1, for example.

Similarly as in FIG. 5, the precoding circuit 100 of FIG. 22 can be realized in various configurations as described above.

As described, according to the present invention, the encoding is realized by processing electric signals before the time division multiplexing, so that it becomes possible for the precoding circuit to handle signals which are slower than the transmission rate, and therefore it becomes easier to realize the higher transmission rate. This is also effective in eliminating the difficulty of shortening the delay time.

Also, in the case of using the D-type flip-flop as the one bit delay, it is possible to eliminate the difficulty of shortening the delay time by feeding back signals taken out from the output of the master latch.

Also, in the case of carrying out the encoding such as preceding, it is possible to eliminate the difficulty of shortening the delay time considerably by applying the preliminary signal processing because the delay time required for the feedback circuit can be expanded to two bits or more.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A precoding-multiplexing circuit, comprising:
    a preceding circuit for carrying out a preceding with respect to n sets of parallel input binary data signals having a bit rate equal to R/n, to obtain n sets of parallel precoded signals; and
    a time division multiplexer for time division multiplexing the parallel precoded signals obtained by the preceding circuit, in units of one bit, and outputting a time division multiplexed output signal having a bit rate equal to R;
    wherein the preceding circuit carries out the preceding such that the time division multiplexed output signal outputted by the time division multiplexer is equivalent to a signal that can be obtained by precoding a binary data signal having a bit rate equal to R that is time division multiplexed in units of one bit in advance.

2. The precoding-multiplexing circuit of claim 1, wherein the precoding circuit further comprises:
- a first EXOR circuit for calculating a first exclusive OR value of all of the n set of the parallel input binary data signals;
- a differential encoder for obtaining an encoded signal by maintaining an output logical value for the first input logical value while inverting an output logical value for the second input logical value in the first exclusive OR value calculated by the first EXOR circuit, and delaying for one time-slot time with respect to the parallel input binary data signals; and
- (n−1) sets of second EXOR circuits provided in correspondence to all but one of the n sets of the parallel input binary data signals, a first one of the second EXOR circuits calculating a second exclusive OR value of a corresponding one of the parallel input binary data signals and the encoded signal obtained by the differential encoder, and each of second to (n−1)-th ones of the second EXOR circuits calculating a second exclusive OR value of a corresponding one of the parallel input binary data signals and an output of an immediately previous second EXOR circuit;
- wherein the encoded signal obtained by the differential encoder and the second exclusive OR values calculated by the second EXOR circuits are outputted as the parallel precoded signals.

3. The precoding-multiplexing circuit of claim 2, wherein the first EXOR circuit is formed by a combination of (n−1) sets of EXOR circuits.

4. The precoding-multiplexing circuit of claim 2, wherein the differential encoder further comprises:
- an EXOR circuit having one input connected to an input of the differential encoder; and
- a delay for delaying an output of the EXOR circuit for one time-slot time;
- wherein an output of the delay is fed back to another input of the EXOR circuit while also outputted as an output of the differential encoder.

5. The precoding-multiplexing circuit of claim 2, wherein the differential encoder further comprises:
- an EXOR circuit having one input connected to an input of the differential encoder; and
- a D-type flip-flop connected to an output of the EXOR circuit and formed by a master latch and a slave latch, an output of the master latch being fed back to another input of the EXOR circuit while also entered into the slave latch, and an output of the slave latch being outputted as an output of the differential encoder.

6. The precoding-multiplexing circuit of claim 2, wherein the differential encoder further comprises:
- (n−1) sets of first delay units connected in series, for sequentially delaying an input of the differential encoder, for one time-slot time at each first delay unit;
- a third EXOR circuit for calculating an exclusive OR value of all of the input of the differential encoder and (n−1) sets of outputs of the first delay units;
- a fourth EXOR circuit having one input connected to an output of the third EXOR circuit, an output of the fourth EXOR circuit being outputted as an output of the differential encoder; and
- a second delay unit for delaying an output of the fourth EXOR circuit for n time-slot time, an output of the second delay unit being fed back to another input of the fourth EXOR circuit.

7. The precoding-multiplexing circuit of claim 6, wherein the third EXOR circuit is formed by a combination of (n−1) sets of EXOR circuits.

8. The precoding-multiplexing circuit of claim 1, wherein n=2 such that the parallel input binary data signals include a preceding signal which is to be time division multiplexed earlier and a subsequent signal which is to be time division multiplexed later, and the precoding circuit further comprises:
- a first delay unit for delaying the subsequent signal for one half time-slot time;
- a first EXOR circuit having one input to which the preceding signal is entered;
- a second EXOR circuit having one input to which the subsequent signal as delayed by the first delay unit is entered;
- a second delay unit for delaying an output of the first EXOR circuit for one half time-slot time;
- a third delay unit for delaying an output of the second EXOR circuit for one half time-slot time; and
- a reset unit for resetting initial states of outputs of the first EXOR circuit and the second EXOR circuit;
- wherein an output of the second delay unit is fed back to another input of the first EXOR circuit while an output of the third delay unit is fed back to another input of the second EXOR circuit, and outputs of the second delay unit and the third delay unit are outputted as the parallel precoded signals.

9. The precoding-multiplexing circuit of claim 8, wherein the time division multiplexer obtains the time division multiplexed output signal by alternately selecting the output of the second delay unit and the output of the third delay unit as constituents of the time division multiplexed output signal.

10. The precoding-multiplexing circuit of claim 1, further comprising:
- a time division demultiplexer for time division demultiplexing binary data signals having a bit rate equal to R, into the n sets of the parallel input binary data signals having a bit rate equal to R/n which are entered into the preceding circuit.

11. A preceding circuit, comprising:
- an input receiving n sets of parallel input binary data signals having a bit rate equal to R/n;
- a precoder for carrying out a precoding with respect to the parallel input binary data signals, to obtain n sets of parallel precoded signals, such that time division multiplexed signals having a bit rate equal to R that can be obtained by time division multiplexing the parallel precoded signals will be equivalent to signals that can be obtained by preceding n sets of binary data signals that are time division multiplexed in units of one bit in advance; and
- an output outputting the parallel precoded signals obtained by the precoder.

12. The precoding circuit of claim 11, wherein the precoder further comprises:
- a first EXOR circuit for calculating a first exclusive OR value of all of the n set of the parallel input binary data signals;
- a differential encoder for obtaining an encoded signal by maintaining an output logical value for the first input logical value while inverting an output logical value for the second input logical value in the first exclusive OR value calculated by the first EXOR circuit, and delaying for one time-slot time with respect to the parallel input binary data signals; and (n−1) sets of second EXOR circuits provided in correspondence to all but one of the n sets of the parallel input binary data signals, a first one of the second EXOR circuits calculating a second exclusive OR value of a corresponding one of the parallel input binary data signals and the encoded signal obtained by the differential encoder, and each of second to (n−1)-th ones of the second EXOR circuits calculating a second exclusive OR value of a corresponding one of the parallel input binary data signals and an output of an immediately previous second EXOR circuit;

wherein the encoded signal obtained by the differential encoder and the second exclusive OR values calculated by the second EXOR circuits are outputted as the parallel precoded signals.

13. The precoding circuit of claim 12, wherein the third EXOR circuit is formed by a combination of (n−1) sets of EXOR circuits.

14. The preceding circuit of claim 12, wherein the differential encoder further comprises:
an EXOR circuit having one input connected to an input of the differential encoder; and
a delay for delaying an output of the EXOR circuit for one time-slot time;
wherein an output of the delay is fed back to another input of the EXOR circuit while also outputted as an output of the differential encoder.

15. The precoding circuit of claim 12, wherein the differential encoder further comprises:
an EXOR circuit having one input connected to an input of the differential encoder; and
a D-type flip-flop connected to an output of the EXOR circuit and formed by a master latch and a slave latch, an output of the master latch being fed back to another input of the EXOR circuit while also entered into the slave latch, and an output of the slave latch being outputted as an output of the differential encoder.

16. The precoding circuit of claim 12, wherein the differential encoder further comprises:
(n−1) sets of first delay units connected in series, for sequentially delaying an input of the differential encoder, for one time-slot time at each first delay unit;
a third EXOR circuit for calculating an exclusive OR value of all of the input of the differential encoder and (n−1) sets of outputs of the first delay units;
a fourth EXOR circuit having one input connected to an output of the third EXOR circuit, an output of the fourth EXOR circuit being outputted as an output of the differential encoder; and
a second delay unit for delaying an output of the fourth EXOR circuit for n time-slot time, an output of the second delay unit being fed back to another input of the fourth EXOR circuit.

17. The precoding circuit of claim 16, wherein the third EXOR circuit is formed by a combination of (n−1) sets of EXOR circuits.

18. The precoding circuit of claim 11, wherein n=2 such that the parallel input binary data signals include a preceding signal which is to be time division multiplexed earlier and a subsequent signal which is to be time division multiplexed later, and the preceding circuit further comprises:
a first delay unit for delaying the subsequent signal for one half time-slot time;

a first EXOR circuit having one input to which the preceding signal is entered;
a second EXOR, circuit having one input to which the subsequent signal as delayed by the first delay unit is entered;
a second delay unit for delaying an output of the first EXOR circuit for one half time-slot time;
a third delay unit for delaying an output of the second EXOR circuit for one half time-slot time; and
a reset unit for resetting initial states of outputs of the first EXOR circuit and the second EXOR circuit;
wherein an output of the second delay unit is fed back to another input of the first EXOR circuit while an output of the third delay unit is fed back to another input of the second EXOR circuit, and outputs of the second delay unit and the third delay unit are outputted as the parallel precoded signals.

19. The precoding circuit of claim 11, further comprising:
a time division demultiplexer for time division demultiplexing binary data signals having a bit rate equal to R, into the n sets of the parallel input binary data signals having a bit rate equal to R/n which are entered into the input of the precoding circuit.

20. A differential encoder for carrying out a preceding with respect to input binary data signals, to obtain encoded signals in which an output logical value is maintained for a first input logical value while an output logical value is inverted for a second input logical value, comprising:
an EXOR circuit having one input to which the input binary data signals are entered; and
a D-type flip-flop connected to an output of the EXOR circuit and formed by a master latch and a slave latch, an output of the master latch being fed back to another input of the EXOR circuit while also entered into the slave latch, and an output of the slave latch being outputted as an output of the differential encoder.

21. A differential encoder for carrying out a preceding with respect to input binary data signals, to obtain encoded signals in which an output logical value is maintained for a first input logical value while an output logical value is inverted for a second input logical value, comprising:
(n−1) sets of first delay units connected in series, for sequentially delaying an input of the differential encoder, for one time-slot time at each first delay unit;
a first EXOR circuit for calculating an exclusive OR value of all of the input of the differential encoder aid (n−1) sets of outputs of the first delay units;
a second EXOR circuit having one input connected to an output of the first EXOR circuit, an output of the second EXOR circuit being outputted as an output of the differential encoder; and
a second delay unit for delaying an output of the second EXOR circuit for n tine-slot time, an output of the second delay unit being fed back to another input of the second EXOR circuit.

22. The differential encoder of claim 21, wherein the first EXOR circuit is formed by a combination of (n−1) sets of EXOR circuits.

* * * * *